(No Model.) 7 Sheets—Sheet 1.

C. L. RIDGWAY.
HEATING STOVE.

No. 395,353. Patented Jan. 1, 1889.

Fig. 1.

(No Model.) 7 Sheets—Sheet 2.

C. L. RIDGWAY.
HEATING STOVE.

No. 395,353. Patented Jan. 1, 1889.

(No Model.) 7 Sheets—Sheet 4.

C. L. RIDGWAY.
HEATING STOVE.

No. 395,353. Patented Jan. 1, 1889.

Fig. 4.

WITNESSES.
Fred B. Dolan
J. M. Dolan

INVENTOR.
Charles L. Ridgway
by his attys
Clarke & Raymond.

(No Model.) 7 Sheets—Sheet 5.

C. L. RIDGWAY.
HEATING STOVE.

No. 395,353. Patented Jan. 1, 1889.

WITNESSES.
Fred. B. Dolan
J. M. Dolan

INVENTOR.
Charles L. Ridgway
by his attys
Clarke & Raymond (No Model.) 7 Sheets—Sheet 6.

C. L. RIDGWAY.
HEATING STOVE.

No. 395,353. Patented Jan. 1, 1889.

WITNESSES.
Fred. B. Dolan.
J. M. Dolan.

INVENTOR.
Charles L. Ridgway
by his atty
Clarke L. Raymond (No Model.)  7 Sheets—Sheet 7.

C. L. RIDGWAY.
HEATING STOVE.

No. 395,353. Patented Jan. 1, 1889.

WITNESSES.
Fred. B. Dolan
J. H. Dolan

INVENTOR
Charles L. Ridgway
by his attys
Clarke & Raymond

UNITED STATES PATENT OFFICE.

CHARLES L. RIDGWAY, OF EVERETT, MASSACHUSETTS, ASSIGNOR TO THE RIDGWAY FURNACE AND STOVE COMPANY, OF NASHUA, NEW HAMPSHIRE.

HEATING-STOVE.

SPECIFICATION forming part of Letters Patent No. 395,353, dated January 1, 1889.

Application filed July 28, 1886. Serial No. 209,276. (No model.)

*To all whom it may concern:*

Be it known that I, CHARLES L. RIDGWAY, of Everett, in the county of Middlesex and State of Massachusetts, a citizen of the United States, have invented a new and useful Improvement in Heating-Stoves, of which the following is a full, clear, and exact description, reference being had to the accompanying drawings, forming a part of this specification, in explaining its nature.

The invention relates to a heating-stove having a square or substantially square base-section, a square or substantially square upper section, an intermediate section cylindrical in form containing the fire-pot and a heating-chamber about it, and separate or independent downtake flues arranged outside the cylindrical section to connect the combustion-chamber within the upper section, preferably at its corners, with the flue in the base-section.

The invention further relates to a heating-stove having a chamber about an open fire-pot, which is connected with or opens into the combustion-chamber and is separated from the ash-pit by a partition, which prevents the entrance of air into it from the ash-pit.

The invention further relates to a heating-stove having a heating-chamber about the fire-pot and a revolving fire-pot, the heating-chamber opening into or connected with the combustion-chamber, and in effect forming a part thereof, and being surrounded by a casing which forms the exterior of the stove, so that an increased heating or radiating surface of great power is provided the stove.

The invention further relates to various details of construction and organization, reference to which will hereinafter be made.

Referring to the drawings, Fig. 9 is a view in plan.

A represents the base-section of the stove. It preferably is square or rectangular in horizontal area, and it contains the ash-pit $a$ and the base-flues, to which reference will hereinafter be made. The upper section, B, of the stove, also, is preferably square or rectangular in plan, and it contains the combustion-chamber $b$.

C is the intermediate section, preferably cylindrical in form, and which is sustained upon the base-section, and in turn supports the upper section, B. It contains the fire-pot $c$ and a chamber, D, which surrounds the fire-pot, and is connected at its upper end with the combustion-chamber.

Figure 1:
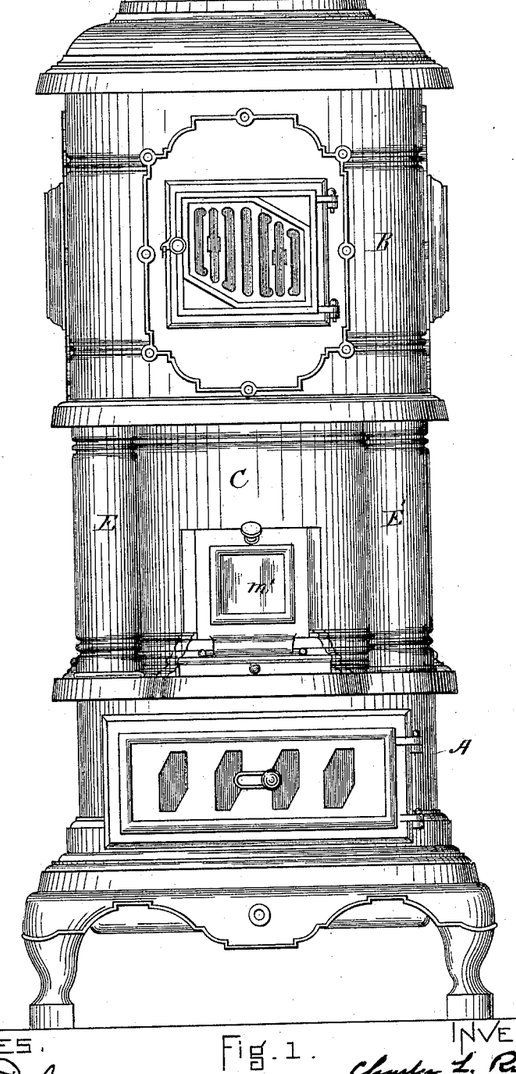
Figure 1 is a view representing a front elevation of my improved stove.
Figure 2:
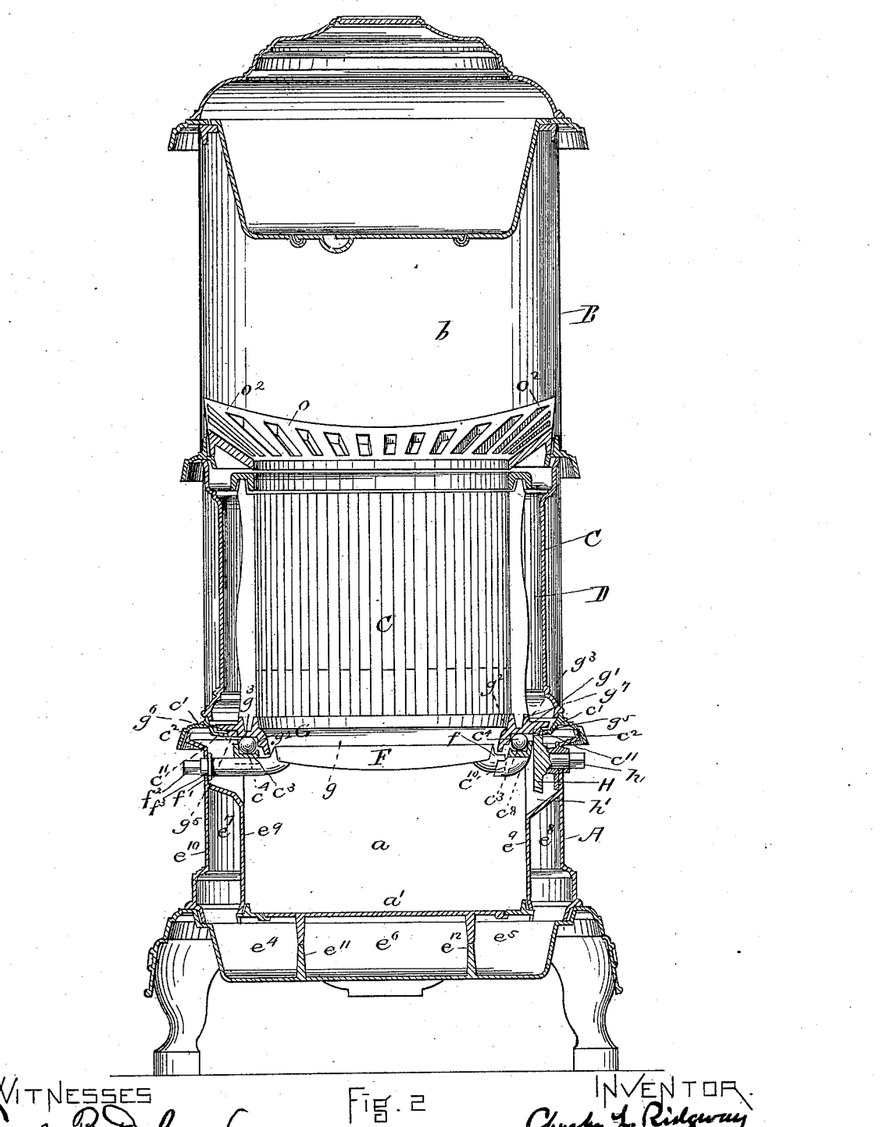
Fig. 2 is a vertical central section of the stove, taken from side to side.
Figure 3:
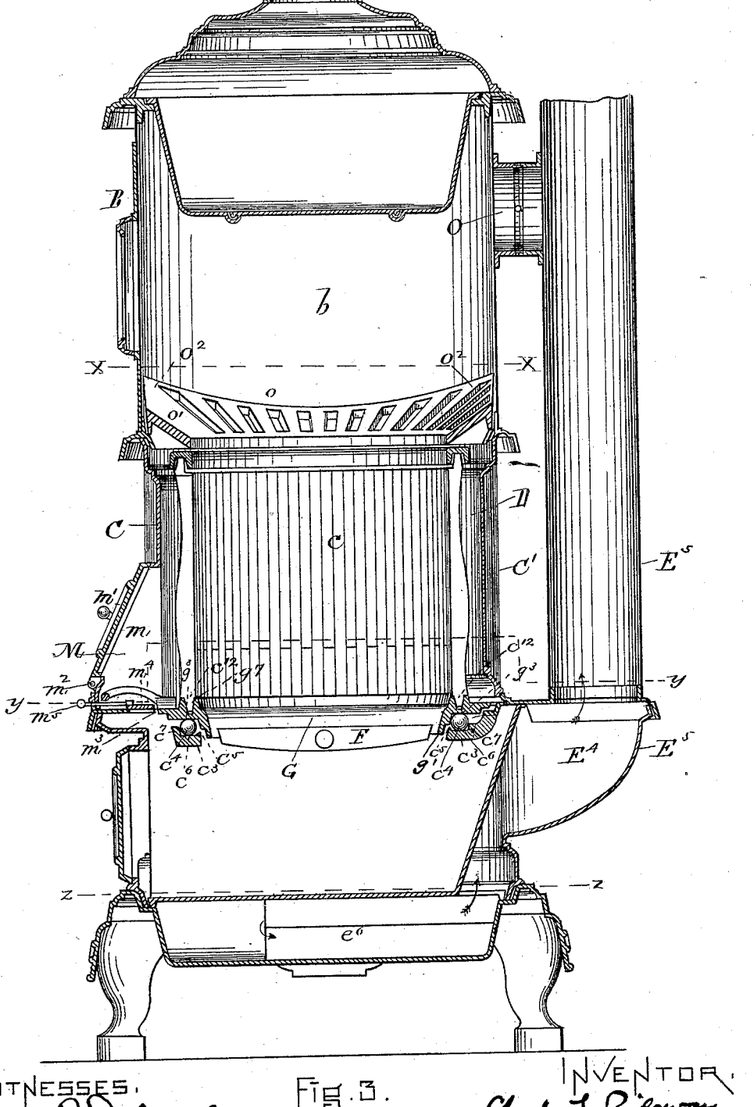
Fig. 3 is a vertical central section of the stove, taken from front to rear.
Figure 4:
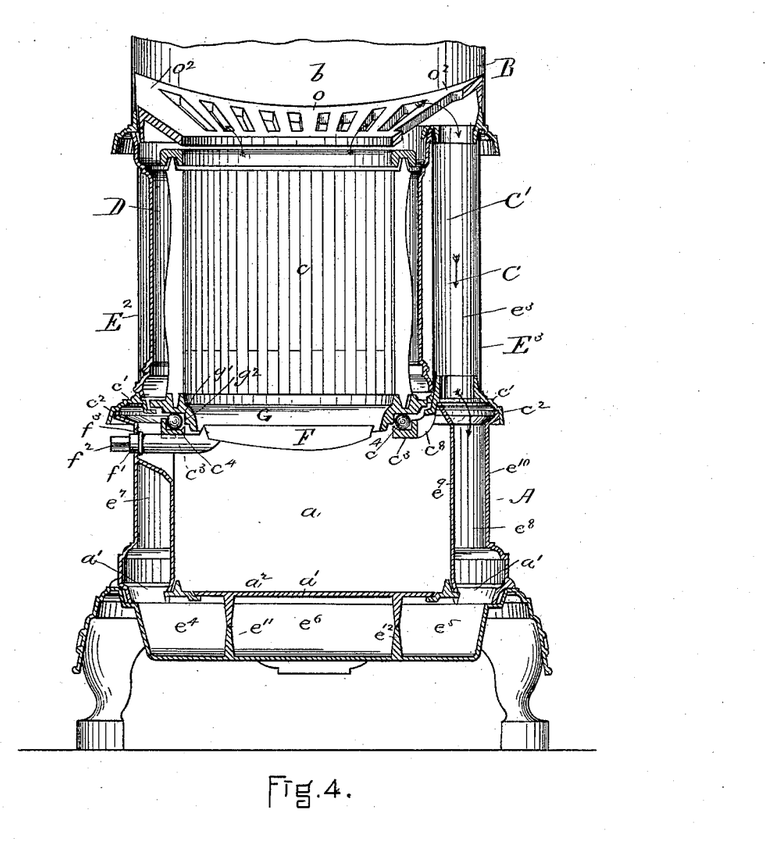
Fig. 4 is a vertical section, principally central, from the left side of the stove to the right side of the fire-pot and then backward upon a diagonal line to the right rear corner of the stove.
Figure 5:
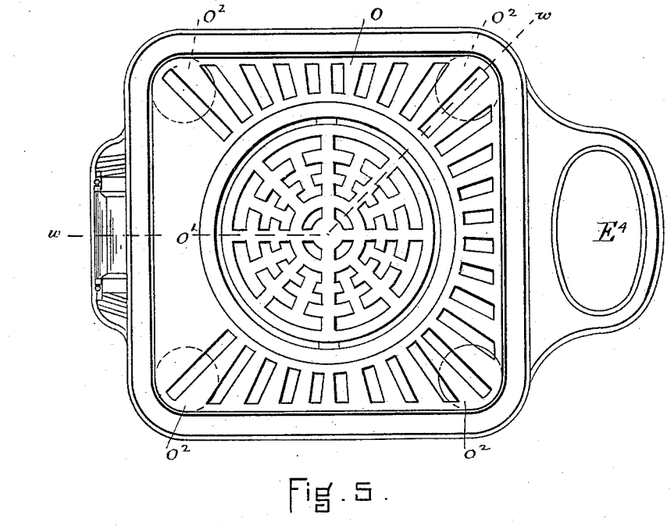
Fig. 5 is a view in horizontal section and plan upon and below the line $x\ x$ of Fig. 3.
Figure 6:
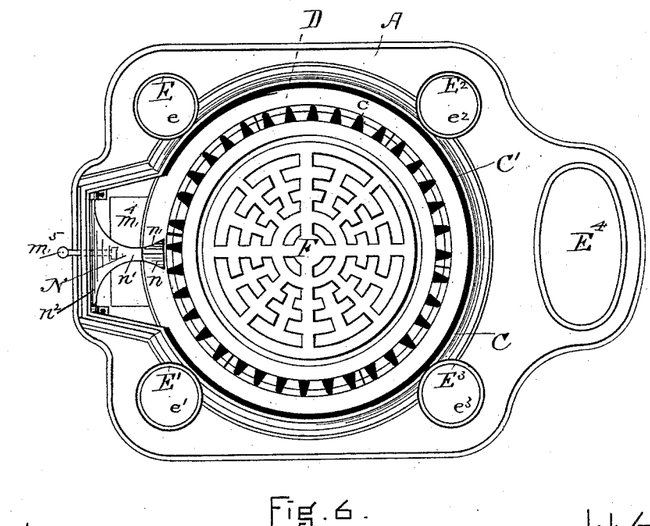
Fig. 6 is a view in horizontal section and plan upon and below the line $y\ y$ of Fig. 3.
Figure 7:
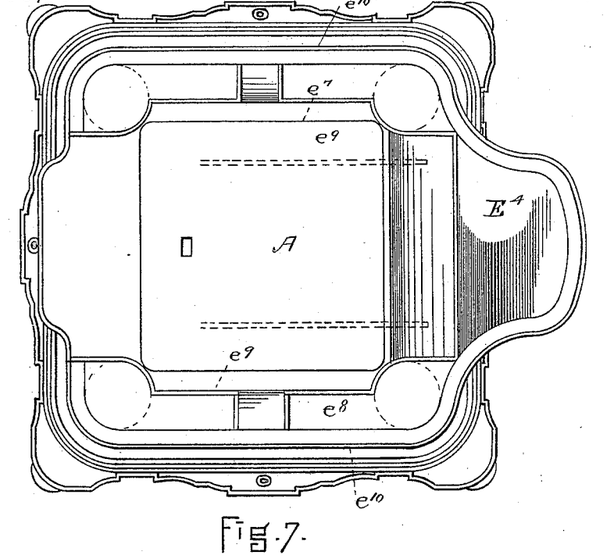
Figs. 7 and 8 are views in horizontal section and plan to represent the arrangement of the base-flues.
Figure 8:
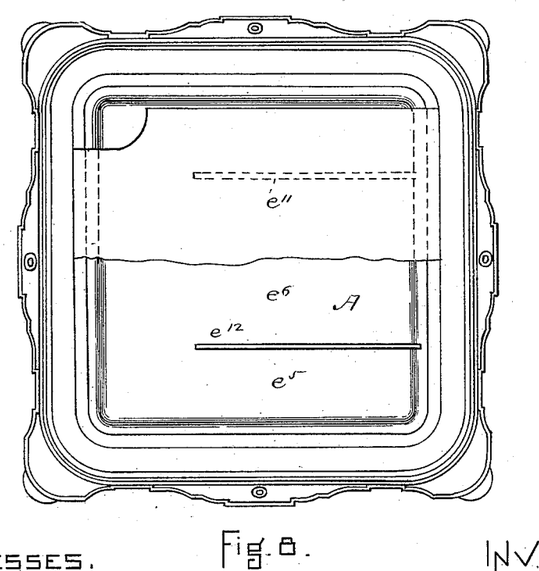
Figure 10:
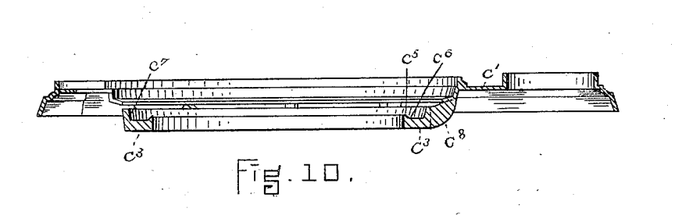
Fig. 10 is a view in section, of the upper horizontal base-plate and fire-pot support.

E E' E² E³ are pipes, preferably cylindrical in shape, arranged outside the intermediate or cylindrical section, C, and preferably to connect each corner of the upper section, B, with the corresponding corners of the lower section, A. These pipes form the down flues or passages $e\ e'\ e^2\ e^3$, which connect the combustion-chamber $b$ with the base-flues. The two rear flues, $e^2\ e^3$, extend into the two side flues, $e^7\ e^8$, of the base, which are arranged on each side of the ash-pit, and these in turn open into or connect with or form parts of the lower base-flues, $e^4\ e^5$, and these base-flues $e^4\ e^5$ open at their front ends into the horizontal central base-flue, $e^6$, which extends below the ash-pit plate $a'$ from the front of the stove back to the uptake passage E⁴ and pipe E⁵. The two front flues, $e\ e'$, open into the front ends of the upper side base-flues, $e^7\ e^8$, so that the products of combustion which pass down the front flues, $e\ e'$, pass through the front parts of the flues $e^7\ e^8$ and through the front parts of the lower base-flues, $e^4\ e^5$, directly to the central base-flue, $e^6$, while the products which pass through the rear flues, $e^2$ $e^3$, pass forward in the flues $e^7$ $e^8$ $e^4$ $e^5$ to enter the central flue, $e^6$. The side base-flues, $e^7$ $e^8$, are formed by the flue-plate $e^9$, which also forms the ash-pit wall, and the outer plates, $e^{10}$, of the base, and the lower base-flues, $e^4$ $e^5$, are separated from the central flue, $e^6$, by the flue-plates $e^{11}$ $e^{12}$. (See Figs. 2, 3, and 8.)

The fire-pot $c$ is provided, preferably, with vertical spaces or openings extending from its top bar to its lower bar, and it is by preference so sustained within the chamber D as to be revolved.

The manner of mounting the fire-pot and grate and of forming the division between the ash-pit and the chamber D which I prefer to employ is represented in Figs. 2, 3, 4, and 6, where $c'$ represents the upper base-plate, of which the outer portion, $c^2$, furnishes the ornamental exposed portion of the plate. The inner portion has connected with it an annular support, $c^3$, for the small steel balls $c^4$, upon which the fire-pot is mounted. This annular support $c^3$ has an upwardly-extending lip, $c^5$, and horizontal surface $c^6$ and a vertical surface, $c^7$, and these three surfaces—namely, the surface of the lip and the horizontal and the vertical surfaces—form a pocket or recess, in which the balls $c^4$ are contained. This section $c^3$ is connected with the outer section of the base-plate by arms or sections $c^8$, which are cast to provide openings or spaces $c^9$ between them. The plate has also the side lug, $c^{10}$, projecting downward into the ash-pit space and being a support for the pivot $f$ of the grate F. The sections of the fire-pot are sustained upon an annular plate or casting, G, which has the downwardly-extending ring $g$, the section $g'$ having the vertical surface $g^2$ and the horizontal surface $g^3$, which receive the balls $c^4$ and form the surfaces which bear upon them, and the cogs $g^5$ and horizontal extension or flange $g^6$, which laps upon the section $c^{11}$ of the base-plate $c'$, but does not come directly in contact therewith. The part bearing the cogs and the flange $g^6$ form the division or partition between the ash-pit and the chamber D. The annular fire-pot-supporting plate G also has a recess, $g^7$, preferably V-shaped or open at its top, which receives the base-extension $c^{12}$, which is preferably narrower at its bottom than at its top, which extends down from the fire-pot and secures the sections of the same to the plate G.

The plate G and the fire-pot are revolved by means of the pinion H, which has a shaft, $h$, which extends through one side of the stove, and is supported by a suitable box which is fastened to the plate of the stove. This gear is arranged to project through one of the holes or recesses between two of the arms or sections $c^8$ of the base-plate $c'$, and is adapted to mesh with or engage the cogs $g^5$ upon the plate G. A small pocket, $h'$, extending from the ash-pit, is arranged to receive the gear.

The grate F is represented as adapted to be tilted or turned upon its pivots $f\, f'$, but not to be oscillated. I would say, however, that I do not confine myself to this especial form of grate. Its pivot or journal is extended through the side of the stove to furnish the end $f^2$ for the reception of an operating wrench or handle, and it has a bearing, $f^3$, in the wall of the stove.

The upper parts of the partition-plates $e^{11}$ $e^{12}$ preferably are cast with a section, $a^2$, of the ash-pit base-plate $a'$, which is so held or supported that it is capable of being lifted out of the ash-pit to provide access to the flues beneath it.

The chamber D is formed, it will be seen, upon the inside by the fire-pot wall, upon the lower side by the plate which separates it from the ash-pit, and upon the outer side by the casing C' of the section C of the stove, which preferably is of but one thickness of metal. It has an enlargement, M, at the front, which has an opening, $m$, whereby access to it and to the fire-pot is obtained, which is closed by a door, $m'$. This door is represented as being hinged at its lower edge, $m^2$, and as being movable outward and downward to uncover the opening.

There is arranged in front of the base-plate $c'$, which separates the front part of the ash-pit from the enlargement M of the chamber D, a hole, $m^3$, through which ashes which escape from the fire-pot onto the plate supporting it escape or are removed to the ash-pit. This hole has a sliding covering-plate, $m^4$, which is moved to open and close it by a rod, $m^5$. There is arranged to rest upon the upper surface of the flange $g^6$ of the plate G a device for throwing the ashes from the plate as it is turned into this enlargement and, if the hole is uncovered, into the ash-pit. This device comprises a plate or bar, N, having oppositely-inclined deflecting-surfaces $n$, so shaped and arranged that whichever way the grate is revolved the ashes are caused to be thrown or removed from the plate by it.

The combustion-chamber is connected with the escape-passage by the direct port O. A coal-guard, $o$, having, preferably, the solid front section, $o'$, back of the entrance to the combustion-chamber and inclined from the sides and front and back of the stove, extends to the inner edge of the fire-pot and covers in part the chamber D and the entrances to the downflues. It is raised at the corners $o^2$, so as to provide an unimpeded connection or passage between all parts of the combustion-chamber and the chamber D with the downflues.

The sides or walls of the base-section are preferably composed of cast metal, and the wall or casing of the intermediate section, C, may be either of cast metal or of sheet metal. The upper section is preferably of sheet metal. The pipes which connect the combustion-chamber with the base-flues preferably are made of sheet metal, although they may be cast, if desired. The effect of this construction is to provide a heating-stove of very great heating capacity, as, in addition to the ordinary heating-surface provided by the combustion-chamber and the base-flues, there is also provided a heating-surface formed by the use of the chamber C and its casing, which forms a radiating-surface. In addition to this there is the heating-surface provided by the area of the pipes forming the downflues. The effect of this chamber D about the fire-pot is not only to produce an increased heat-radiating surface, but also to aid the combustion of fuel and the combustion of gases in the combustion-chamber. This is effected by separating the chamber from the ash-pit, so that very little, if any, air enters it from the ash-pit, all the air entering the ash-pit being used to support the combustion in the fire-pot by passing, either through the grate or above the grate, into the fire-pot. The combustion in the fire-pot is thus caused to be upward into the combustion-chamber and outward through the openings in the fire-pot into the chamber D, and it is for this reason that I term the chamber D a "downward extension" of the combustion-chamber. Its use in effecting the combustion of the gases in the combustion-chamber will be readily understood when it is observed that by permitting this lateral combustion, as well as direct combustion, in the combustion-chamber the intensity of the fire is caused to vary—that is, it is hotter at first in the lower part of the fire-pot and close to the wall thereof, so that the products of combustion pass out into the chamber D, and in their highly-heated condition pass into the combustion-chamber and unite with the gases which are produced from the remainder of the fuel, and which would not otherwise be consumed because not so highly heated. I prefer, also, that the fire-pot be so arranged that it may be revolved within the chamber C, as by so doing the plate G is more easily freed from ashes and access to the fuel-chamber through the door $m'$ is more complete; but I would not be understood as confining myself to a fire-pot which is adapted to be revolved. I would also say that two downflues only, instead of four, may be provided, and that it would be possible to extend them through the chamber D, although the construction already herein described is very much to be preferred.

Figure 11:
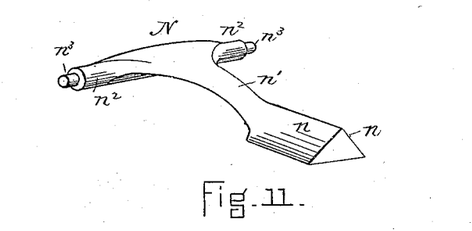
Fig. 11 is a view in perspective of the device or scraper for removing ashes from a projecting flange of the base-plate of the fire-pot.

The plate N, having the deflecting-surfaces $n\ n$, has an arm, $n'$, (best seen in Fig. 11,) which extends to the cross-bar $n^2$, and this cross-bar has the end pivots, $n^3$, by which, in connection with suitable caps, the bar $n^2$ is so secured in place as to permit the scraping or clearing end of the plate or arm to rise and fall to accommodate itself to any inequalities or obstructions upon the surface of the flange $g^6$, which it clears. This automatic up-and-down movement presents a great practical advantage over a construction which employs a scraper which is rigidly attached and has no vertical movement in relation to the revolving plate. Neither a scraper rigidly attached to a fixed portion of a stove or furnace and operating in connection with a movable plate to clear the same of ashes and other refuse nor the described annular fire-pot-supporting plate is herein broadly claimed, both being shown in United States Patent No. 281,795, issued to me July 24, 1883.

A recessed plate and a series of balls in the recess constituting anti-friction supports for a revoluble fire-pot wall are not herein claimed, either separately or in combination, the same being embraced in my application, serially numbered 172,748, filed in United States Patent Office on July 27, 1885.

Having thus fully described my invention, I claim and desire to secure by Letters Patent of the United States—

1. A heating-stove having the base-section A, the upper section, B, containing a combustion-chamber, a heat-radiating section or shell, C, the fire-pot $c$, inclosed thereby, and a chamber, D, interposed between the radiating outer section and the fire-pot, separated from the ash-pit and connected with the combustion-chamber, substantially as described.

2. The combination, in a heating-stove, of a base-section containing an ash-pit and base-flues, an upper section containing a combustion-chamber, an interposed section, the fire-pot contained therein provided with openings or recesses, a chamber, D, surrounding the same and opening into the combustion-chamber, a partition-plate separating the said chamber from the ash-pit, the pipes E E′ $E^2$ $E^3$, forming the downflues, and the uptake $E^4$, substantially as described.

3. The combination of the base having the side flues, $e^7\ e^8$, arranged on each side of the ash-pit, the side flues, $e^4\ e^5$, and the horizontal flue $e^6$ below the ash-pit plate, the front flues, $e\ e'$, opening into the front ends of the side flues, $e^4\ e^5$, the combustion-chamber $b$, and the uptake $E^4$, substantially as described.

4. The base-plate $c'$, having the section $c^2$, forming an exposed surface of the section $c^3$, constituting a support for the fire-pot wall, and the intermediate arms, $c^8$, forming the recesses $c^9$, in combination, substantially as described.

5. The combination, with the stove, of the annular plate G, for supporting a fire-pot, having the recess $g^7$, for receiving the extension $c^{12}$ of the fire-pot, substantially as described.

6. The combination, with a stove, of the annular plate G, having the downwardly-extending ring $g$, the surfaces $g^2\ g^3$, the flange $g^6$, the teeth $g^5$, and the recess $g^7$, for receiving and holding the base of the fire-pot wall, substantially as described.

7. The plate $c'$, having a ball-holding recess provided with the lip $c^5$, in combination with the balls $c^4$, the plate G, and the fire-pot wall $c$, substantially as described.

8. The combination, in a heating-stove, of the fire-pot $c$, the chamber D, opening into the combustion-chamber $b$, the casing C′, forming the exterior of the stove, and the enlargement M to the chamber D, all substantially as described.

9. The combination of the scraper having two deflecting or scraping surfaces, $n$, with the plate G, having the extension or flange $g^6$, substantially as described.

10. The combination of the fire-pot $c$, the chamber D, the flues $e$ $e'$ $e^2$ $e^3$, and the guard $o$, substantially as described.

11. In a heating-stove, the combination, with the fuel-chamber, of the coal-guard $o$, raised or extending upward at its corners $o^2$, substantially as and for the purposes described.

12. The combination of the outer casing, $e^{10}$, with the plate $e^9$, shaped to provide the base-flues $e^7$ $e^8$, substantially as described.

13. In a heating-stove, the ash-pit $a$, having the pocket $h'$, for holding the gear H, substantially as described.

14. The combination, in a heating-stove, of the chamber D, having the enlargement M, and the door $m'$, hinged at $m^2$ to open outward and downward, substantially as described.

15. The combination of the plate G, having the extension or flange $g^6$, with the scraper N, having one or more deflecting-surfaces, $n$, and supports to permit a vertical movement to be imparted to it by the plate or by any obstruction thereon, substantially as and for the purposes described.

CHARLES L. RIDGWAY.

Witnesses:
F. F. RAYMOND, 2d,
J. M. DOLAN.